United States Patent Office 2,774,801
Patented Dec. 18, 1956

2,774,801
CONVERSION OF METHYLNAPHTHALENES

Harry L. Coonradt, Woodbury, and Wilbur K. Leaman, Pitman, N. J., assignors to Socony Mobil Oil Company, Inc., a corporation of New York No Drawing. Application September 16, 1952, Serial No. 309,931

8 Claims. (Cl. 260—672)

This invention relates to the conversion of methyl-substituted aromatic compounds. It is more particularly concerned with the catalytic conversion of methyl-substituted naphthalenes to naphthalene and benzenoid hydrocarbons.

As is well known to those familiar with the art, the demethylation of methyl-substituted naphthalenes, as opposed to dealkylation (the removal of an alkyl radical of at least two carbon atoms), has been difficult to achieve. In so far as is now known, demethylation in the presence of chromia or molybdena catalysts has not heretofore been proposed.

It has now been found that methyl-substituted naphthalenes can be converted to naphthalene and benzenoid hydrocarbons, by a process which is simple and commercially feasible. It has been discovered that methyl-substituted naphthalenes can be converted to naphthalene and benzenoid hydrocarbons at elevated temperatures, in the presence of a chromia catalyst, or of a molybdena catalyst, and of hydrogen gas. It has also been discovered that the pressure of the hydrogen gas is determinative of the relative amounts of naphthalene and of benzenoid hydrocarbons produced.

Accordingly, it is an object of the present invention to provide a process for converting methyl-substituted naphthalenes into naphthalene and into greater or lesser amounts of benzenoid hydrocarbons. A specific object is to provide a process to convert methyl-substituted naphthalenes to naphthalene by contacting the methyl-substituted naphthalene with a chromia or a molybdena catalyst in the presence of hydrogen gas under atmospheric pressure. Another specific object is to provide a process to convert methyl-substituted naphthalenes into both naphthalene and benzenoid hydrocarbons by contacting the methyl-substituted naphthalene with a chromia or a molybdena catalyst in the presence of hydrogen gas under superatmospheric pressures. Other objects and advantages of this invention will become apparent to those skilled in the art from the following detailed description.

Broadly stated, the present invention provides a process for converting methyl-substituted naphthalenes into other valuable aromatic hydrocarbons, which comprises contacting the methyl-substituted naphthalene with a catalyst comprising chromia or molybdena, at a temperature of between about 1000° F. and about 1150° F., for a contact time of between about one second and about 1000 seconds, and in the presence of hydrogen gas under super-atmospheric pressure.

The process of this invention can be applied to any methyl-substituted naphthalene. Non-limiting examples are 1-methylnaphthalene; 2-methylnaphthalene; 1,4-dimethylnaphthalene; 2,3-dimethylnaphthalene; 2,7-dimethylnaphthalene; 1,2,5-trimethylnaphthalene; 1-methyl-4-ethylnaphthalene; 1-methyl-7-isopropylnaphthalene; 1,4-dimethyl-6-ethylnaphthalene; and mixtures containing two or more of the foregoing. The charge material can be relatively pure methyl-substituted naphthalene or it can be a mixture of two or more. Likewise, the charge can be a hydrocarbon fraction which is rich in methyl-substituted naphthalenes, such as certain aromatic petroleum fractions.

The catalysts utilizable herein are chromia or molybdena. The process of this invention is operable with chromia or molybdena alone. In practice, however, it is usually preferred that the catalyst be composited with a suitable carrier. Any of the well-known catalyst supports are suitable herein, including the oxides of aluminum, zirconium, zinc, magnesium, titanium, silicon, and thorium. Catalysts comprising composites of chromia and alumina, or of molybdena and alumina, are especially preferred. The term "composite" includes any of the usual associations of two or more materials, such as metal oxides, commonly used to produce catalysts, including impregnated catalysts, coprecipitated catalysts, cogelled catalysts, and the like. The chromia-alumina catalysts, wherein the alumina is present as a support, generally contain between about 4 weight per cent and about 12 weight per cent of chromia, based on the weight of the finished catalyst. Preferably, such a catalyst contains between about 6 and about 10 weight per cent of chromia. The cogelled chromia-alumina catalysts, on the other hand, contain between about 18 mole percent and about 80 mole percent chromia, and preferably between 18 and about 40 mole percent chromia. The molybdena-alumina catalysts generally contain between about 5 weight percent and about 20 weight percent molybdena, based on the weight of the finished catalyst, and preferably between about 8 and about 12 weight percent. The catalyst can be in the form of granules of any size or shape ordinarily used for catalytic materials, i. e., in the form of rods, pellets, spheroids, etc. Particle size of the catalyst is usually between about 4 mesh and about 12 mesh.

The conditions of time, temperature, and pressure are critically interrelated. The present process has two aspects, i. e., (1) the formation of naphthalene predominantly, and (2) the formation of naphthalene and of a valuable light aromatic fraction. As discussed hereinafter, the direction of the process is controlled mainly by the hydrogen pressure.

Generally, the process of this invention is carried out at temperatures of between about 1000° F. and about 1150° F., and preferably at between about 1050° F. and about 1150° F. The contact time depends upon the temperature and the pressure. In general, it varies indirectly with the temperature and directly with the pressure. The contact time can be between about one second and about 1000 seconds, preferably between about 5 seconds and about 500 seconds.

The present process is conducted in the presence of hydrogen gas. Hydrogen can be supplied to the reaction vessel in the form of relatively pure hydrogen gas, or of a gas rich in hydrogen, such as certain refinery overhead gases. The hydrogen gas can also be formed in situ, under the conditions within the reaction vessel, from light hydrocarbons which decompose to form hydrogen, such as, for example, butane, propane, cyclohexane, and the like. The molar proportion of hydrogen to methylnaphthalene can vary between about 0.5:1, respectively, and about 10:1, respectively, and preferably between about 1:1, respectively, and about 6:1, respectively.

The pressure of the hydrogen gas is determinative of the conversion involved. Under superatmospheric pressures, methylnaphthalenes are demethylated, in part, to naphthalene. There is also formed a substantial amount of another valuable fraction, denoted a "light" aromatic fraction. This fraction comprises benzene, toluene, xylenes, etc. Due to its aromatic character, it is a valuable blending stock for premium gasolines or the production of aromatic chemicals. In order to achieve production of both naphtalene and the light aromatic fraction, the pressure of the hydrogen gas should be between about 50 pounds per square inch gauge and about 2000 pounds per square inch gauge, preferably between about 100 and about 1000 pounds per square inch gauge.

At substantially atmospheric pressures, on the other hand, the present process proceeds almost entirely to the production of naphthalene by demethylation. Relatively small proportions of the aforedescribed light aromatic fraction are obtained. There is produced, however, a relatively large amount of coke. Pressures utilizable for such a process vary between about one pound per square inch gauge and about 25 pounds per square inch gauge, and preferably between about 5 and about 15 pounds per square inch gauge. As those skilled in the art will appreciate, the selection of the pressure conditions will depend upon the desirability of producing the light aromatic hydrocarbon fraction, upon the economic factors involved in the use of high pressure equipment, and upon the feasibility of tolerating the formation of large amounts of coke.

Any reaction vessel suitable for carrying out contact catalytic operations can be used. The reactor should be provided with suitable means for maintaining the catalyst temperature. Contact between the catalyst and the charge material can be effected by passing the charge vapors over or through the catalyst. The catalyst can be in the form of a fixed bed or a moving bed. The process, of course, can be performed in a batch process. It is preferable, however, to employ continuous operation. In such an operation, the charge is passed through the reactor in contact with the catalyst. Then the effluent reaction product is subjected to a product separation operation. The portion of the charge stock which remains undemethylated and/or which is incompletely demethylated (as with polymethylnaphthalene charge materials) can be recycled to the reactor, until the maximum ultimate conversion has been effected.

The following examples are for the purpose of demonstrating the process of this invention and the superior results obtained therefrom. It must be strictly understood that this invention is not to be limited by the reactants and conditions used in the examples, or by the operations and manipulations involved therein. As will be apparent to those skilled in the art, other reactants and conditions, as set forth hereinbefore, can be used to practice this invention.

APPARATUS AND OPERATION

The reactor used in the runs described in the examples was a stainless steel tube suspended in a bath of molten lead. The temperature of the lead was controlled to maintain the catalyst temperature constant to within about 10° F. Catalyst temperature was measured by means of thermocouples extending into the top, middle, and bottom portions of the catalyst bed. A total volume of about 150 cubic centimeters of catalyst was placed in the reactor. Accessory equipment included a heated, thermostatically controlled burette for measuring the charge, pumps, preheater coils, a condensing and collecting system for aromatic and gaseous products, and a system for determining the amount of coke on the catalyst by a combustion method.

In operation, the catalyst, at operating temperature, was purged with nitrogen gas and then flushed with hydrogen. Then, the charge material, in the liquid state, together with added gases or liquids was passed through a preheater to raise the temperature thereof to the reaction temperature. The combined charge was then passed downwardly through the catalyst bed at a rate sufficient to effect the desired contact time. A sample of the total gas collected was analyzed in the mass spectrometer to determine its composition and the weight of the components. The principal component was methane.

The amount of coke land down on the catalyst was determined by combustion methods, i. e., by converting it to carbon dioxide and analyzing therefor. The relative amounts of aromatic materials present in a sample of the liquid products was determined by usual methods, i. e., by mass spectroscopy, ultraviolet light spectroscopy, distillation, etc.

Example 1

2-methylnaphthalene was contacted with a chromia-alumina catalyst, at a temperature of about 1100° F., for a contact time of about 4 seconds, and in the presence of hydrogen gas under a pressure of about 5–10 pounds per square inch gauge (substantially atmospheric pressure). The molar proportion of hydrogen to 2-methylnaphthalene was about 4.9:1, respectively. The catalyst was a cogelled chromia-alumina catalyst containing about 32 weight percent chromia and about 68 weight percent alumina. Pertinent data and results of this run are set forth in Table I.

Example 2

2-methylnaphthalene was contacted with the chromia-alumina catalyst described in Example 1, at a temperature of about 1100° F., for a contact time of about 314 seconds, and in the presence of hydrogen gas under a pressure of about 400 pounds per square inch gauge. The molar proportion of hydrogen to 2-methylnaphthalene was about 2.1:1, respectively. Pertinent data and results are set forth in Table I.

Example 3

2-methylnaphthalene was contacted with a chromia-alumina catalyst described in Example 1, at a temperature of about 1100° F., for a contact time of about 230 seconds, and in the presence of hydrogen gas under a pressure of about 800 pounds per square inch gauge. The molar proportion of hydrogen to 2-methylnaphthalene was about 6.2:1, respectively. Pertinent data and results are set forth in Table I.

Example 4

A commercial mixture of dimethylnaphthalenes (mixed isomers) was contacted with the chromia-alumina catalyst of Example 1, at a temperature of about 1100° F., for a contact time of about 3 seconds, and in the presence of hydrogen gas under a pressure of about 10 pounds per square inch gauge (substantially atmospheric pressure). The molar proportion of hydrogen to dimethylnaphthalenes was about 6.7:1, respectively. Pertinent data and results are set forth in Table I.

Example 5

A commercial mixture of dimethylnaphthalenes (mixed isomers) was contacted with the chromia-alumina catalyst of Example 1, at a temperature of about 1100° F., for a contact time of about 107 seconds, and in the presence of hydrogen gas under a pressure of about 400 pounds per square inch gauge. The molar proportion of hydrogen to dimethylnaphthalenes was about 5.4:1, respectively. Pertinent data and results are set forth in Table I.

Example 6

Dimethylnaphthalenes (mixed isomers) were contacted with the chromia-alumina catalyst of Example 1, at a temperature of about 1100° F., for a contact time of about 213 seconds, and in the presence of hydrogen gas under a pressure of about 800 pounds per square inch gauge. Pertinent data and results are set forth in Table I.

Example 7

2-methylnaphthalene was contacted with a molybdena-alumina catalyst, at a temperature of about 1100° F., for a contact time of about 263 seconds, and in the presence of hydrogen gas under a pressure of about 400 pounds per square inch gauge. The molar proportion of hydrogen to 2-methylnaphthalene was about 2.7:1, respectively. The catalyst was a commercial molybdena-alumina catalyst containing about 10 weight percent molybdena and about 90 weight percent alumina. Pertinent data and results are set forth in Table I.

tween about 1050° F. and about 1150° F., for a contact time of between about 5 seconds and about 500 seconds, Table I.—DEMETHYLATION OF METHYLNAPHTHALENES OVER CHROMIA-ALUMINA AND MOLYBDENA CATALYSTS

| Example | Hydrocarbon Feed | Catalyst | L. H. S. V. | Contact Time, Sec. | Temp., °F. | Total Press., p. s. i. g. | Moles H₂ per Mole H. C. | Wt. percent per Pass | | | | Ultimate Wt. percent | | | | Ult. Wt. percent [e] of Theory |
|---|---|---|---|---|---|---|---|---|---|---|---|---|---|---|---|---|
| | | | | | | | | Naph. | Coke | Gas | Light Ends | Naph. | Coke | Gas | Light Ends | |
| 1 | (a) | (b) | .24 | 4 | 1,100 | 10 | 4.9 | 13.8 | 12.5 | 4.3 | 0.8 | 42.2 | 38.2 | 13.2 | 2.5 | 47.4 |
| 2 | (a) | (b) | .24 | 314 | 1,100 | 400 | 2.1 | 29.9 | 2.6 | 9.9 | 24.9 | 44.5 | 3.9 | 14.8 | 37 | 50 |
| 3 | (a) | (b) | .24 | 230 | 1,100 | 800 | 6.2 | 41.6 | 9.3 | 20.6 | 16.0 | 47.8 | 10.7 | 23.7 | [f] 17.8 | 53.6 |
| 4 | (c) | (b) | .24 | 3 | 1,100 | 10 | 6.7 | 6.9 | 19.5 | 14.0 | 4.3 | 15.5 | 43.6 | 31.2 | 9.7 | 19.1 |
| 5 | (c) | (b) | .24 | 107 | 1,100 | 400 | 5.4 | 27.0 | 3.1 | 14.8 | 12.0 | 47.4 | 5.5 | 26.0 | [g] 21.1 | 58.8 |
| 6 | (c) | (b) | .24 | 213 | 1,100 | 800 | 7.7 | 36.9 | 4.9 | 28.4 | 17.7 | 42.0 | 5.5 | 32.4 | [h] 20.1 | 52.0 |
| 7 | (a) | (d) | .24 | 263 | 1,100 | 400 | 2.7 | 31.2 | 13.2 | 11.2 | 3.9 | 52.2 | 22.2 | 18.9 | 6.5 | 58.7 |

[a] Hydrocarbon used was Reilley Tar and Chemical Co.'s 2-methylnaphthalene.
[b] Chromia-alumina bead catalyst was used with the following composition: 32 wt. percent $Cr_2O_3$, 68 wt. percent $Al_2O_3$.
[c] Hydrocarbon used was Reilley Tar and Chemical Co.'s dimethylnaphthalenes.
[d] Molybdena-alumina catalyst was used. Its composition is 10 wt. percent $MoO_3$, 90 wt. percent $Al_2O_3$.
[e] Theoretical yield is based on reaction producing methane and naphthalene. Theoretical yield from monomethylnaphthalene is 89%; from dimethylnaphthalene 81%.
[f] Mass spectroscopy indicates this fraction is about 85% benzene, toluene and xylene.
[g] Mass spectroscopy indicates this fraction is about 85% benzene and various methylbenzenes.
[h] Mass spectroscopy indicates this fraction is about 90% benzene, toluene and xylene.

From the data set forth in Table I, it will be apparent that demethylation of methylnaphthalenes to naphthalene is achieved by hydrogenolysis in the presence of a chromia or molybdena catalyst. When hydrogen gas is used under superatmospheric pressures, a valuable aromatic fraction (benzene, etc.) is also produced. Good conversion to naphthalene is also achieved under atmospheric pressures. However, the amount of coking is large and little of the aromatic fraction is produced. Accordingly, it will be appreciated that demethylation is achieved at any pressure. The factors to be considered in selecting a pressure are the cost of pressure operation vs. the loss due to coking and failure to form benzenoid fractions.

Although the present invention has been described with preferred embodiments, it is to be understood that modifications and variations can be resorted to without departing from the spirit and scope of this invention, as those skilled in the art will readily understand. Such variations and modifications are considered to be within the scope and purview of the apepnded claims.

What is claimed is:

1. A process for converting methyl-substituted naphthalenes into other valuable aromatic hydrocarbons, which comprises contacting the methyl-substituted naphthalene with a catalyst selected from the group consisting of (1) chromia supported on alumina and containing between about 4 weight percent and about 12 weight percent chromia, (2) chromia cogelled with alumina and containing between about 18 mole percent and about 80 mole percent chromia, and (3) molybdenum oxide-alumina containing between about 5 weight percent and about 20 weight percent molybdenum oxide, at a temperature of between about 1000° F. and about 1150° F., for a contact time of between about one second and about 1000 seconds, and in the presence of hydrogen gas under pressures of between about 50 pounds per square inch gauge and about 200 pounds per square inch gauge.

2. A process for demethylating methyl-substituted naphthalenes, which comprises contacting a methyl-substituted naphthalene with a catalyst comprising supported chromia containing between about 4 percent and about 12 percent chromia, by weight, at a temperature of between about 1050° F. and about 1150° F., for a contact time of between about 5 seconds and about 500 seconds, and in the presence of hydrogen gas under a pressure of between about 100 pounds per square inch gauge and 1000 pounds per square inch gauge.

3. A process for demethylating methyl-substituted naphthalenes, which comprises contacting the methyl-substituted naphthalene with a cogelled chromia-alumina catalyst containing between about 18 mole percent and about 40 mole percent chromia, at a temperature of between about 1050° F. and about 1150° F., for a contact time of between about 5 seconds and about 500 seconds, and in the presence of hydrogen gas under a pressure of between about 100 pounds per square inch gauge and about 1000 pounds per square inch gauge.

4. A process for demethylating 2-methylnaphthalene, which comprises contacting 2-methylnaphthalene with a cogelled chromia-alumina catalyst containing about 32 weight percent chromia, at a temperature of about 1100° F., for a contact time of about 314 seconds, and in the presence of hydrogen gas under a pressure of about 400 pounds per square inch gauge.

5. A process for demethylating dimethylnaphthalenes, which comprises contacting a dimethylnaphthalene with a cogelled chromia-alumina catalyst containing about 32 weight per cent chromia, at a temperature of about 1100° F., for a contact time of about 107 seconds, and in the presence of hydrogen gas under a pressure of about 400 pounds per square inch gauge.

6. A process for demethylating dimethylnaphthalenes, which comprises contacting a dimethylnaphthalene with a cogelled chromia-alumina catalyst containing about 32 weight percent chromia, at a temperature of about 1100° F., for a contact time of about 213 seconds, and in the presence of hydrogen gas under a pressure of about 800 pounds per square inch gauge.

7. A process for demethylating methyl-substituted naphthalene, which comprises contacting the methyl-substituted naphthalene with a molybdenum oxide-alumina catalyst containing between about 5 weight percent and about 20 weight percent molybdenum oxide, at a temperature of between about 1050° F. and about 1150° F., for a contact time of between about 5 seconds and about 500 seconds, and in the presence of hydrogen gas under a pressure of between about 100 pounds per square inch gauge and about 1000 pounds per square inch gauge.

8. A process for demethylating 2-methylnaphthalene, which comprises contacting 2-methylnaphthalene with a molybdenum oxide-alumina catalyst containing about 10 percent, by weight, of molybdenum oxide, at a temperature of about 1100° F., for a contact time of about 263 seconds, and in the presence of hydrogen gas under a pressure of about 400 pounds per square inch gauge.

References Cited in the file of this patent

UNITED STATES PATENTS

| | | |
|---|---|---|
| 2,194,449 | Sachanen et al. | Mar. 19, 1940 |
| 2,438,570 | Mattox | Mar. 30, 1948 |
| 2,632,779 | Pfenning | Mar. 24, 1953 |
| 2,653,176 | Beckberger | Sept. 22, 1953 |

(Other references on following page)

UNITED STATES PATENTS

| 2,692,293 | Heinemann | Oct. 19, 1954 |
|---|---|---|
| 2,700,638 | Friedman | Jan. 25, 1955 |

FOREIGN PATENTS

| 695,273 | Germany | July 25, 1940 |

OTHER REFERENCES

Ipatieff: Jour. Amer. Chem. Soc., vol. 55, pages 3696–3701 (6 pages; September 1933).

Sachanen: Conversion of Petroleum, 2nd edition, pages 88, 388, 389, 391–394 (7 pages), published by Reinhold Pub. Corp., New York (1948).